H. J. ODET.
MEASURING TAP.
APPLICATION FILED APR. 3, 1913.
1,184,563.  Patented May 23, 1916.
3 SHEETS—SHEET 1.
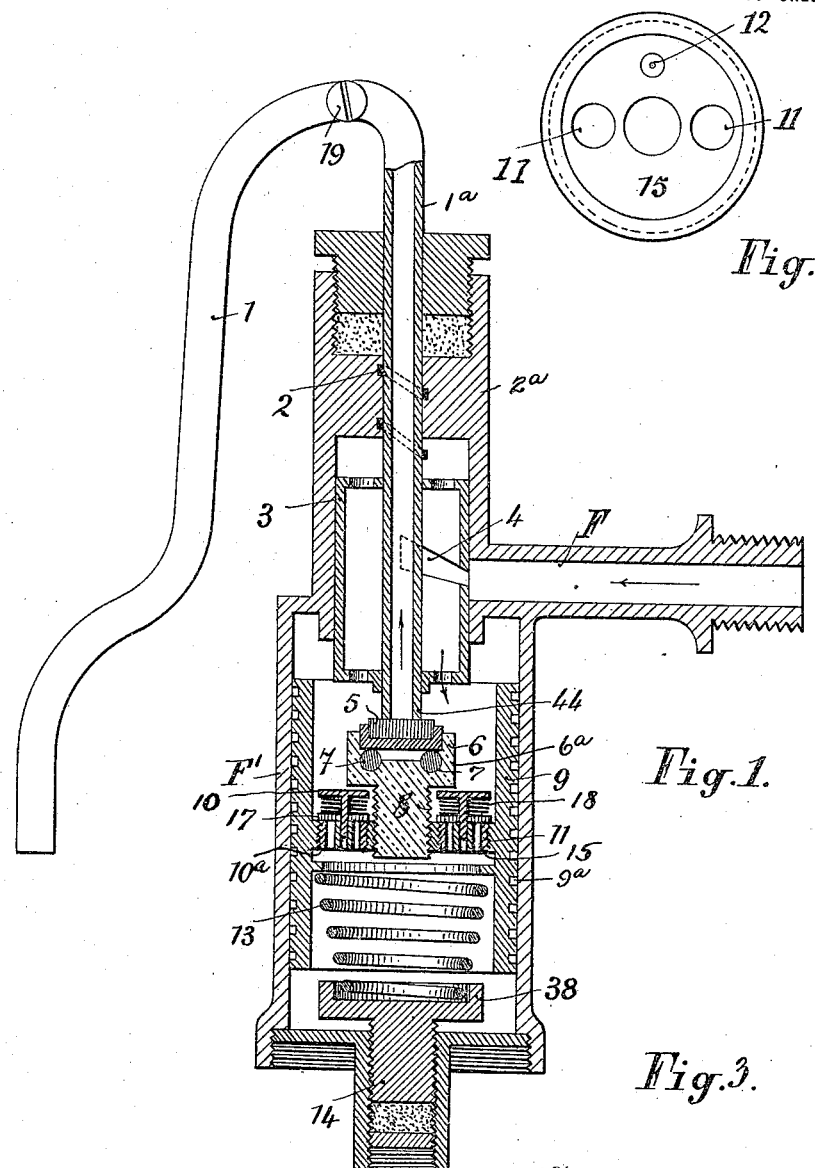

H. J. ODET.
MEASURING TAP.
APPLICATION FILED APR. 3, 1913.
1,184,563.
Patented May 23, 1916.
3 SHEETS—SHEET 2.
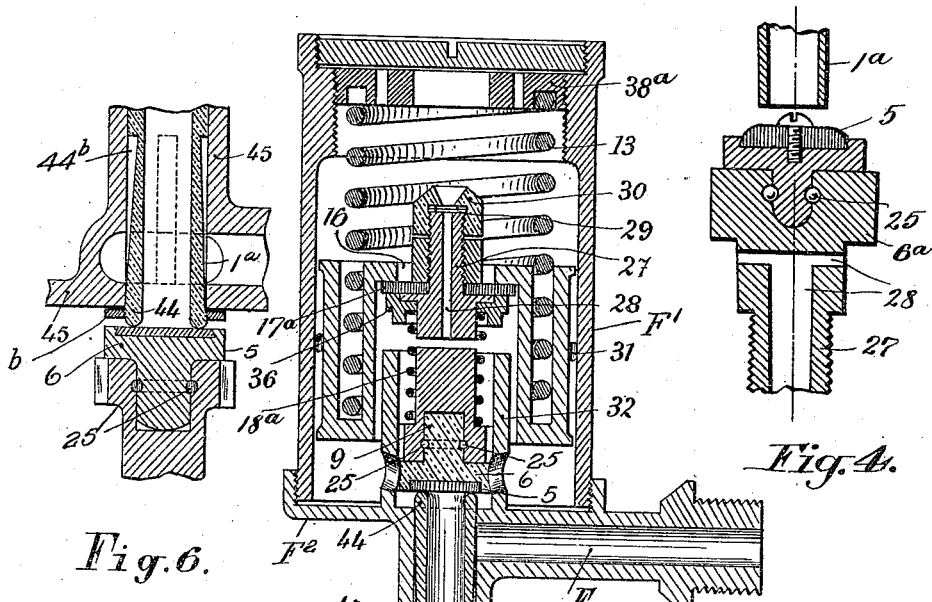
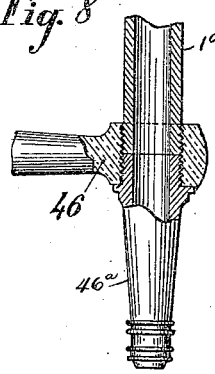
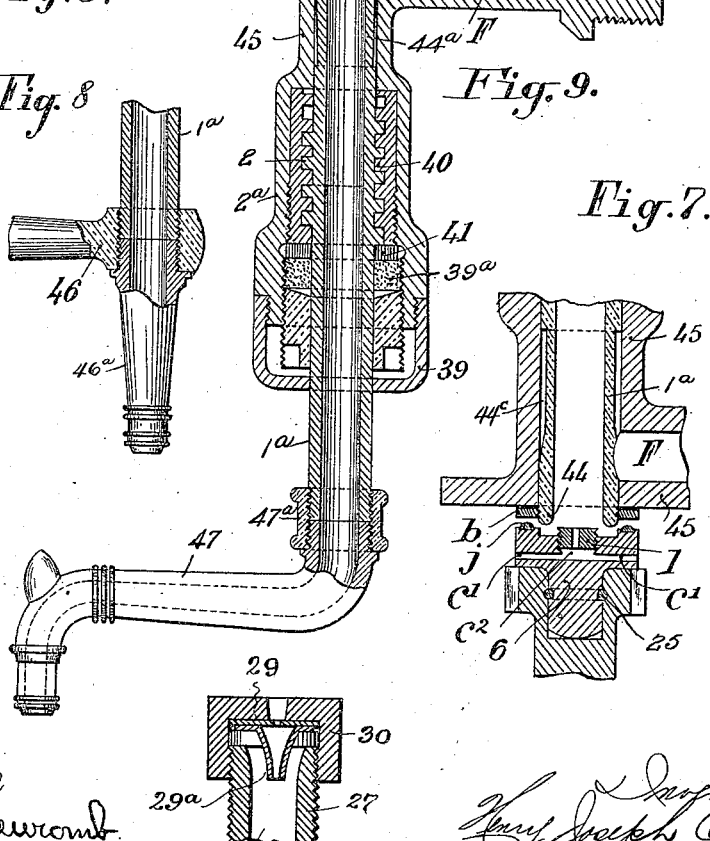

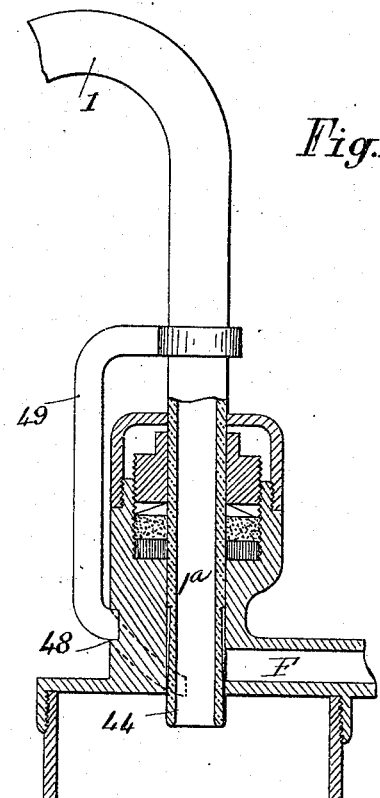
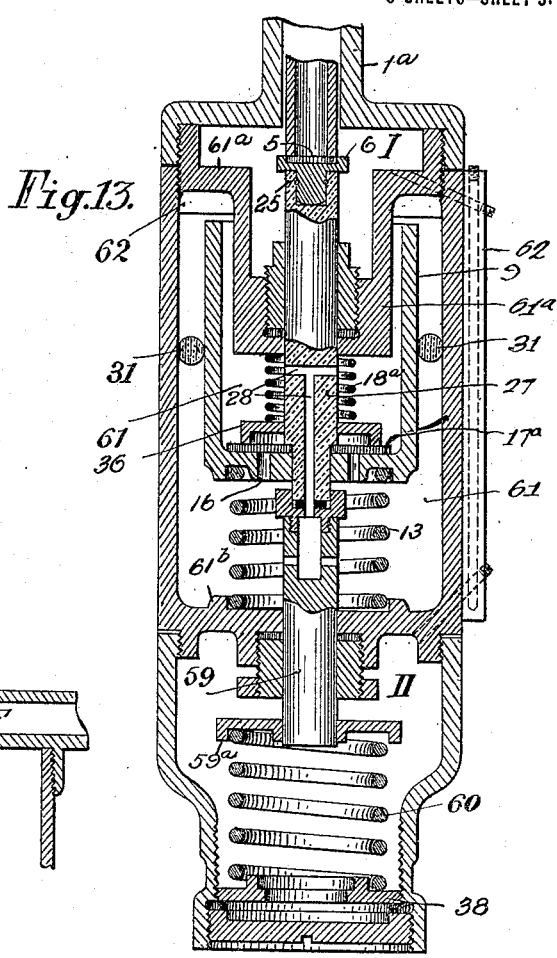
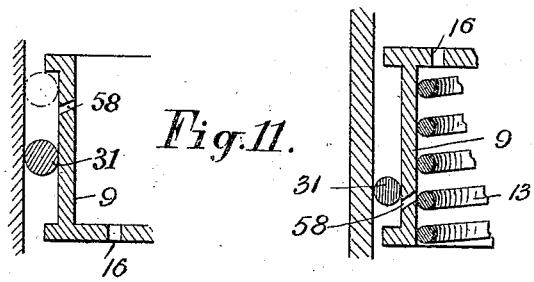

UNITED STATES PATENT OFFICE.

HENRY JOSEPH ODET, OF LYON, FRANCE.

MEASURING-TAP.

1,184,563.   Specification of Letters Patent.   Patented May 23, 1916.

Application filed April 3, 1913.   Serial No. 758,730.

*To all whom it may concern:*

Be it known that I, HENRY JOSEPH ODET, a citizen of the Republic of France, and residing at Lyon, in the Republic of France, have invented certain new and useful Improvements in Measuring-Taps, of which the following is a specification.

The invention relates to a measuring tap or valve, whereby the automatic limiting of a quantity of delivered water is assured.

It is an object of the invention to provide a device where the intensity of the discharge decreases in proportion to its duration.

Another object of the invention is to provide a device which cannot be tampered with, which can be regulated and which leaves the hands free during the discharge of the water.

Other objects will become more apparent with reference to the accompanying drawings, the specification and the claims, forming part thereof.

Figure 1 is a sectional elevation of one form of the device made in accordance with the invention. Fig. 2 is a detail view of a partition provided in the piston. Fig. 3 is a detail view of a modification of a piston valve. Fig. 4 is a detail view of a cup. Fig. 5 is a detail sectional view of a tightening nut and rod. Figs. 6 and 7 show in inverted position detail views of the main valve. Fig. 8 is a modification of the handle. Fig. 9 is a sectional view of my preferred form. Figs. 10 to 13 show detail sectional views of still further modifications.

The device is mounted like an ordinary tap or faucet above the sink. Water is discharged through a hollow manipulating tube or handle 1 arranged in the form of a gooseneck and capable of being swung to the right or to the left. In these movements the vertical portion $1^a$ of the handle, owing to the high pitched threads 2 formed thereon and engaging internal threads of the neck $2^a$ of the outer casing, rises or descends according to direction of rotation. A cylindrical valve 3 is secured to the part $1^a$ and participates in the various movements executed by the handle. This valve is provided with a spiral graduated slot 4 which may be brought into communication with the water inlet F. At the same time the end 44 of the portion $1^a$ presses against or recedes from, according to the direction of rotation of portion $1^a$, the valve 5 which closes it when a contact is formed. This valve is in the form of a facing member carried by a rotary movable head 6 in a cup $6^a$ on walls 7, to prevent injury to said valve by the turning of the contact of the handle portion $1^a$ with same. The cup $6^a$ is provided with a shank 8 removably and adjustably screwed into a partition 15 formed in a piston 9 and said partition is formed with screw-threaded holes 11 adapted to receive check-valves, said valves being adapted to open when the piston 9 is depressed, and each valve is composed of a screw-threaded perforated plug $10^a$, a head 10, a washer 17 and a spring 18. The partition 15 is also formed with a small hole 12 so as always to provide a passage for the water or other liquid and allow the piston to return. In lieu of the check valves as shown in Fig. 1, there may be used the form illustrated in Fig. 3, consisting of a single washer $17^a$ controlling a plurality of apertures 16 in the partition 15 and spring-pressed to its seat by a spring $18^a$ acting against the adjustable head 6.

The piston 9 is controlled by a spring 13 and the outer end of said spring rests on a movable cup 38 adjustable by the screw-threaded shank 14 of same. The outer circumference of the piston is grooved at $9^a$ so as to obtain a tight fitting with the casing $F^1$ without any packing. Owing to the small section of the opening 12 it cannot create any serious oblique factor tending to prevent the piston from returning to its normal position and when the piston is depressed, which movement can be very sudden, the valves 10 allow the water to flow from the rear of the piston. Whatever may be the position of the handle 1, $1^a$, if the device is considered after a period of rest the valve 5 would be raised against the end 44 and close the outlet through said handle. By turning down toward the left, for example, the portion $1^a$ of the handle descends and pushes back the piston 9 against its spring 13 without the valve 5 ceasing to close the end 44 and the water behind the piston 9 escapes through the return valves 10. The tap or valve is thus brought into working position and is ready for discharging water. In order to obtain a discharge through the neck 1, $1^a$ it suffices to turn back the handle portion 1 to the right. The end 44 will then separate from the end 5 because the piston 9 can only rise slowly as the water flows slowly through the hole 12, but at the same time the port 4 in the valve 3 intervenes as follows: When the handle is moved back slightly to the right thus bringing the widest portion of the port 4 into register with the inlet F a large amount of water is permitted to enter from said inlet, but at the same time the end 44 is only very slightly raised above the valve 5 so that the rising of the latter very quickly effects the closing of the outlet 1, 1ª. If, on the other hand, the handle 1 is turned considerably to the right, the end 44 will be separated a greater distance from the valve 5 and the time necessary for the latter to encounter again said end will be much longer but the slot 4 presents its narrow portion to the inlet F, thus diminishing the passage of the water.

The tap is reversible and may be constructed so that the water enters through the handle 1 and is discharged through the opening F. In this case the escape is regulated instead of the admission and it may also be arranged that the pressure of the water in the inner chamber above the partition 15 shall always be the same as that of the rising column. When the slide-valve 3 is in its closing position, it relieves the partition 15 and outlet 1, 1ª from the pressure, and generally there will be no pressure on 15 and in 1, 1ª during discharge unless the channel is artificially throttled. For this purpose a screw-stud for regulating the escape is arranged at 19. The two ends of the valve 3 are perforated, as shown, to allow for the passage of the liquid.

Referring to Fig. 9, a modification is illustrated similar to Fig. 1. The mobility of the head 6 of the valve 5 is obtained by fitting two transverse pins 25 in an annular groove formed in a shank provided on said head. The admission of water to the rear of the piston to insure its return to normal position after operation is effected through the rod 27 carried by said piston and perforated with longitudinal and transverse channel 28. The end of the rod is fitted with a thin perforated plate 29 (see Fig. 5) which is secured to said rod by means of a nut 30 and thus can be easily exchanged. A vertical channel 28 of the rod tends to retain any impurities that might clog the opening. In the detail shown in Fig. 5, a protection cone 29ª is provided to further avoid the passage of impurities. In order to obtain a sliding fit between the piston and the casing, a rolling packing ring 31 of india rubber is provided around the piston 9 whose edges do not contact with the casing F¹. In this manner any deformation, intentional or not, for example by outer pressure, cannot prevent reciprocation of the piston. To prevent lateral movement of the piston during its reciprocation an interior guiding sleeve is provided integral with, or screwed, or embedded in, the cap F². The check valves, permitting the escape of the water when the piston is driven back are arranged around the rod 27 and comprise a washer of rubber 17ª controlling a plurality of holes 16 provided in the end-wall of the piston. In this modification the spring 13 acts from above and is partly inserted between double walls formed in the piston and rests with the outer end on a removably secured ring 38ª by means of which its tension may be regulated. The operating outlet rod 1ª projects through a stuffing box surrounded by a cap 39, the summit of which provides a fixed point independent of the varying positions of the packing 39ª within said stuffing box and surrounding the outlet rod. The high pitched threads 2 of the vertical portion 1ª of the handle are engaged in a socket 40 screwed into a housing 2ª of the neck 45 of the casing, the wear, consequently, affecting a piece that can be readily renewed. A washer 41 is provided beneath the packing 39ª. The end 44 of the tube 1ª is tapered downwardly at 44ª and according to the length and depth of the taper presented to the inlet opening F the admission of water is varied.

In Figs. 6 and 7, end 44 of the tube 1ª is here formed with a number of outwardly tapered slots 44ᵇ and with an annular groove 44ᶜ, respectively, whereby the admission of water is controlled. A means is also provided to close the tube before it is closed automatically. The tube 1ª carries at its inlet end 44 a flange or shoulder b provided with a seating face of leather or india-rubber. For certain uses it may be desirable to provide a continuous stream of liquid. This is obtained by replacing the outlet cut off joint formed by the encountering of the valve 5 with the end 44 of the tube 1ª by a peripheral valve j adapted to coöperate with a shoulder b, b as shown in Fig. 7. The movable head 6ª carrying the valve j is perforated with channel c¹, c¹, causing its center to communicate with the exterior and with the central channel c² in the axis of the outlet which is provided with a gage 1. The continuous current may be interrupted by completely turning down the gage 1.

The tap may be mounted in any position. Thus Figs. 1 and 9 show two positions the one inverse of the other. Since the discharge in Fig. 9 is centered the outlet portion of the tube may be replaced by a solid lever 46 or retained and given the shape of a spout 47. A sleeve 47ª enables the parts 1, 46 and 46ª or 47 to be fitted to the tube as desired.

In the modification shown in Fig. 10, a spiral slot or groove 48 is formed in which the end of an arm 49 integral with the tube 1ª travels on the outside of the device as a substitute for the rapid screw threads on said tube. In order to provide for the escape of the air confined beneath the packing ring 31 holes 58 (Fig. 11) are provided in the piston 9 slightly below the end-position which the ring assumes in an upward direction; the escape of the air is instantaneous. By forming the holes 58 at the bottom of the piston the air escapes first beneath the piston 9, then through the valve, on each operation (Fig. 12). In order to protect the ring and the calibrated opening from deposits of the liquid the piston 9 and the parts relating thereto are arranged in a housing 61 closed at the top and at the bottom by partitions 61$^a$ and 61$^b$, having two stuffing boxes through which the axial rod 27 prolonged at 59 passes so that it supports the same pressure on its extremities. The housing receives the liquid in the upper and lower chambers I and II, communicating by a hollow rib 62. A regulation of the return movement of the piston 9 can be obtained by a spring 60 in the chamber II, which spring presses against the washer 59$^a$ secured to the axial rod. The housing 61 contains a suitable liquid not affecting either the india-rubber or the parts employed in the apparatus, and not forming any deposits, which permits of very small calibrated openings and strong springs.

From Fig. 9 it can immediately be seen that the use of two liquids is possible without needing a special chamber for containing them. Oil, for example, occupying the casing F$^1$ and having its level disposed beneath the cross channels 28 or, more exactly, beneath the end-position of the ring 31, will not in any way obstruct the inlets and outlets of liquid and will protect the rolling surface on said casing of the ring as well as the small liquid passages 28 from incrustation, thus assuring the slow return of the piston. The result will be the same in the position of Fig. 1 with a liquid heavier than water.

What I claim is:

1. An automatic tap for water and other liquids, comprising a casing with an inlet connection for the liquid, a spring-controlled piston slidable within said casing, a check valve carried by and movable with the piston, a rotatable device forming the outlet of the tap and being adapted to reciprocate the piston, and means for varying the intensity of the discharge approximately inversely to its duration.

2. An automatic tap for water and other liquids, comprising a casing with an inlet connection for the liquid, a spring-controlled piston slidable within said casing, a check valve carried by and movable with the piston, a rotatable device forming the outlet of the tap and being adapted to reciprocate the piston, and means movable with said rotatable device for varying the intensity of the discharge approximately inversely to its duration.

3. An automatic tap for water and other liquids, comprising a casing with an inlet connection for the liquid, a tubular piston having double walls, a spring inserted between the walls of said piston and pressing with its outer end against said casing, a sleeve integral with the casing and projecting into said piston to guide the same, a check valve and a main valve carried by and movable with the piston and a rotatable device forming the outlet of the tap and being adapted to reciprocate the piston.

4. An automatic tap for water and other liquids, comprising a casing with an inlet connection for the liquid, a tubular piston having double walls, a spring inserted between the walls of said piston and pressing with its outer end against said casing, a sleeve integral with the casing and projecting into said piston to guide the same, a check valve and a main valve carried by and movable with the piston, a rotatable device forming the outlet of the tap and being adapted to reciprocate the piston, and means for varying the intensity of the discharge approximately inversely to its duration.

In testimony whereof I have signed this specification in the presence of two subscribing witnesses.

HENRY JOSEPH ODET.

Witnesses:
 LOUIS CARORENS,
 ANTOINE COLRY.